(12) United States Patent
Tanaka

(10) Patent No.: US 8,396,584 B2
(45) Date of Patent: Mar. 12, 2013

(54) LIBRARY APPARATUS

(75) Inventor: Kiyotaka Tanaka, Kato (JP)

(73) Assignee: Fujitsu Limited, Kawasaki (JP)

( * ) Notice: Subject to any disclaimer, the term of this patent is extended or adjusted under 35 U.S.C. 154(b) by 193 days.

(21) Appl. No.: 12/656,188

(22) Filed: Jan. 20, 2010

(65) Prior Publication Data

US 2010/0129183 A1 May 27, 2010

Related U.S. Application Data

(63) Continuation of application No. PCT/JP2007/064776, filed on Jul. 27, 2007.

(51) Int. Cl.
B65G 1/137 (2006.01)

(52) U.S. Cl. .......... 700/214; 700/245; 414/273

(58) Field of Classification Search .......... 700/214, 700/215, 218
See application file for complete search history.

(56) References Cited

U.S. PATENT DOCUMENTS

| | | | | |
|---|---|---|---|---|
| 5,418,971 | A * | 5/1995 | Carlson | 710/24 |
| 5,557,595 | A * | 9/1996 | Ishii | 720/649 |
| 6,801,834 | B1 * | 10/2004 | Konshak et al. | 700/245 |
| 7,920,380 | B2 * | 4/2011 | Merrow et al. | 361/695 |
| 2004/0057346 | A1 * | 3/2004 | Romig | 369/30.32 |
| 2005/0237868 | A1 * | 10/2005 | Nabe et al. | 369/44.11 |

FOREIGN PATENT DOCUMENTS

| | | |
|---|---|---|
| JP | 50-119654 | 9/1975 |
| JP | 58-114167 | 7/1983 |
| JP | 64-60502 | 3/1989 |
| JP | 2-35651 | 2/1990 |
| JP | 10-35827 | 2/1998 |
| JP | 3209653 | 7/2001 |
| JP | 2004-196439 | 7/2004 |
| JP | 2007-15780 | 1/2007 |

OTHER PUBLICATIONS

English Translation of the International Preliminary Report on Patentability mailed Feb. 18, 2010 in corresponding International Patent Application PCT/JP2007/064776.
International Search Report for PCT/JP2007/064776, mailed Oct. 9, 2007.

* cited by examiner

Primary Examiner — Gene Crawford
Assistant Examiner — Kyle Logan
(74) Attorney, Agent, or Firm — Staas & Halsey LLP

(57) ABSTRACT

A library apparatus includes a robot in operation that performs transfer between the record medium storage shelf and the input-output device, a robot on standby that stands by at a predetermined position as a reserve of the robot in operation; and a control device that controls operations of two of the robot in operation and the robot on standby. The information record medium has a bar code for identification. The robot in operation and the robot on standby individually include a read unit which has an imaging device to optically read the bar code of the information record medium. The robot on standby further includes an air spray unit which blows air to the imaging device of the robot in operation which moves relatively to a predetermined position and attitude.

8 Claims, 8 Drawing Sheets

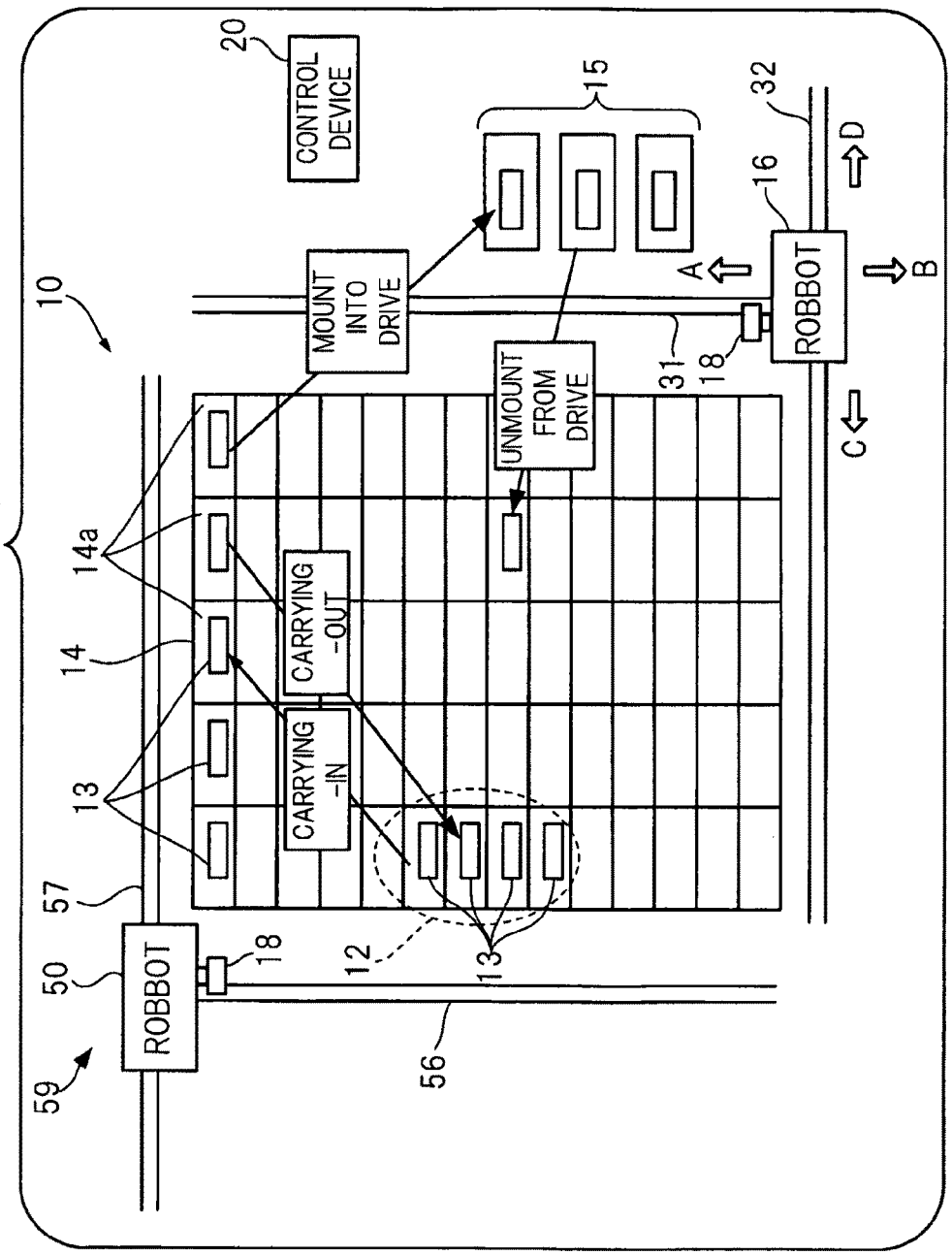

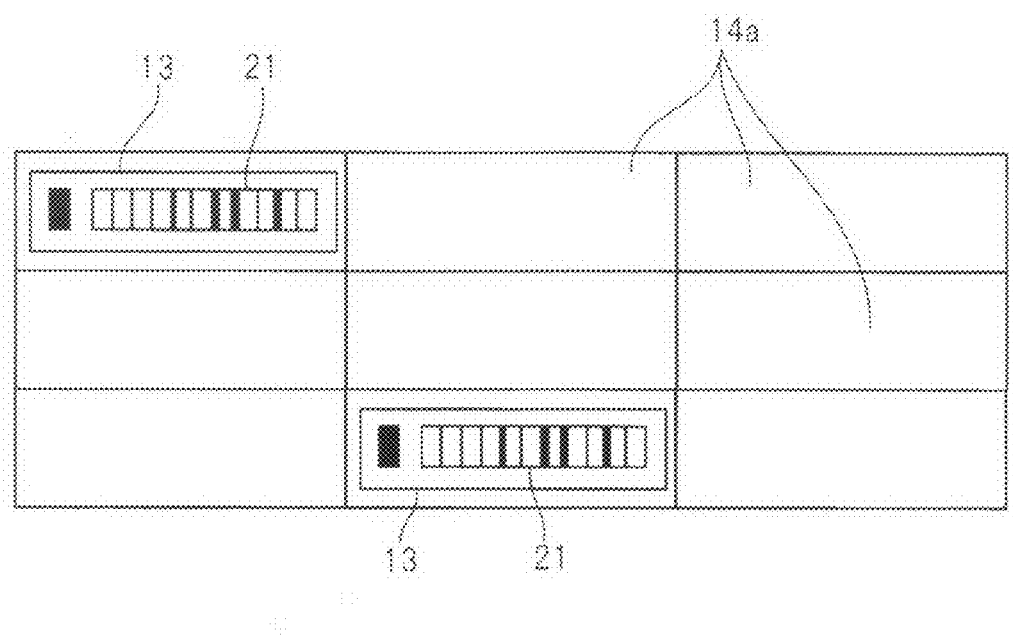

LIBRARY APPARATUS

CROSS-REFERENCE TO RELATED APPLICATION

This is a continuation application of PCT/JP2007/064776, filed on Jul. 27, 2007.

FIELD

Embodiments discussed herein are related to a library apparatus in which plural information record media such as a magnetic tape are stored and which inputs and outputs information in and form the plural information record media.

BACKGROUND

There is known a library apparatus which is capable of storing plural information record media such as a magnetic tape in a housing thereof and which transfers those information record media by a robot to an information input-output apparatus such as a magnetic tape drive to input and output information. A bar code for identification is attached to the information record media. A bar code read device is provided with the robot. The robot reads the bar code of an information record medium placed at an information record medium transfer entrance by the bar code read device and transfers and stores the information record medium to a predetermined storage shelf. An optical bar code read device that uses an imaging device such as a CCD (Charge Coupled Device) is one example of a known bar code read device.

Some are provided in the housing of this library apparatus, to remove heat. These fans are driven when the power is turned on. The fans are driven to generate an air flow in the housing, and so dusts outside the apparatus may be suctioned with the air flow to enter into the housing. In addition, also in the inside of the housing, dusts which are produced by a friction between the information record medium and the storage shelf and the like are floating in the housing, and so those dusts attach to a CCD lens of the bar code read device and the CCD lens becomes dirty or dusty and so a read error where the bar code may not be properly read may occur.

When such read error occurs, a service person is informed of the error. Then, the service person performs cleaning of the CCD lens. Until the cleaning is completed, the function of the library apparatus is stopped.

Conventionally, for example, of library apparatuses in which plural cartridge magnetic tapes are stored, there has been disclosed a library apparatus (see Japanese Laid-open Patent Application H02-35651) in which plural cells to store the cartridge magnetic tapes, a hand mechanism to hold and release the plural cartridge magnetic tapes, and an accesser to move the hand mechanism between the cells are provided, and air passages are formed respectively inside the hand mechanism and the accesser, and when the hand mechanism is positioned at a position for holding a cartridge magnetic tape in a cell, a coupling section for coupling the air passages of both is formed, a compressed air is blown into the hand mechanism from an air compressor, and the compressed air is blown into a cell from an opening of the accesser via the air passage of the hand mechanism, the coupling section and the air passage of the accesser so that dusts attached to the cartridge magnetic tape are blown out.

However, in the apparatus disclosed in Japanese Laid-open Patent Application H02-35651, there is a problem in that the air passage of the hand mechanism and the air passage of the accesser must be accurately coupled by the coupling section when the hand mechanism is positioned for holding the cartridge magnetic tape. Therefore, devices such as the hand mechanism, the accesser and the positioning mechanism must be finely processed, and this increases the cost of the apparatus.

SUMMARY

According to an aspect of the invention, a library apparatus includes:

a housing;

a record medium storage shelf that stores a plurality of information record media;

an input-output device in which the information record medium is loaded and which inputs and outputs information in and from the loaded information record medium;

a robot in operation that performs transfer between the record medium storage shelf and the input-output device;

a robot on standby that stands by at a predetermined position as a reserve of the robot in operation; and a control device that controls operations of two of the robot in operation and the robot on standby, wherein the record medium storage shelf, the input-output device, the robot in operation, the robot on standby and the control device are arranged in the housing, the information record medium has a bar code for identification, the robot in operation and the robot on standby individually include a read unit which has an imaging device to optically read the bar code of the information record medium, and the robot on standby further includes an air spray unit which blows air to the imaging device of the robot in operation which moves relatively to a predetermined position and attitude.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a schematic diagram illustrating an internal structure of the library apparatus of the embodiment;

FIG. 4 is a diagram illustrating a magnetic tape stored in a record medium storage shelf of the embodiment;

DESCRIPTION OF EMBODIMENTS

In the following, embodiments according to the invention will be explained with reference to the drawings.

FIG. 1 is an external view illustrating a first embodiment of the library apparatus of the invention.

A library apparatus 10 of the first embodiment corresponds to an example of a first library apparatus of the invention.

Figure 1A:
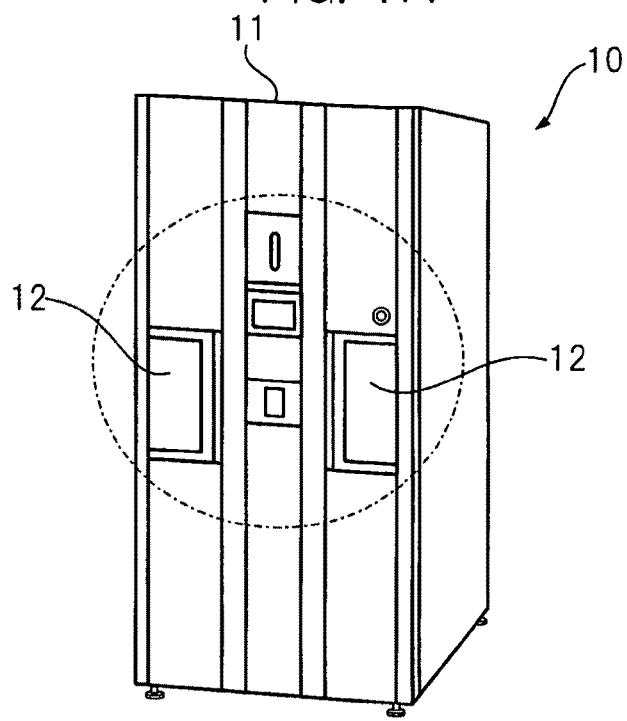
FIGS. 1A and 1B are external views illustrating a first embodiment of a library apparatus of the invention.
Figure 1B:
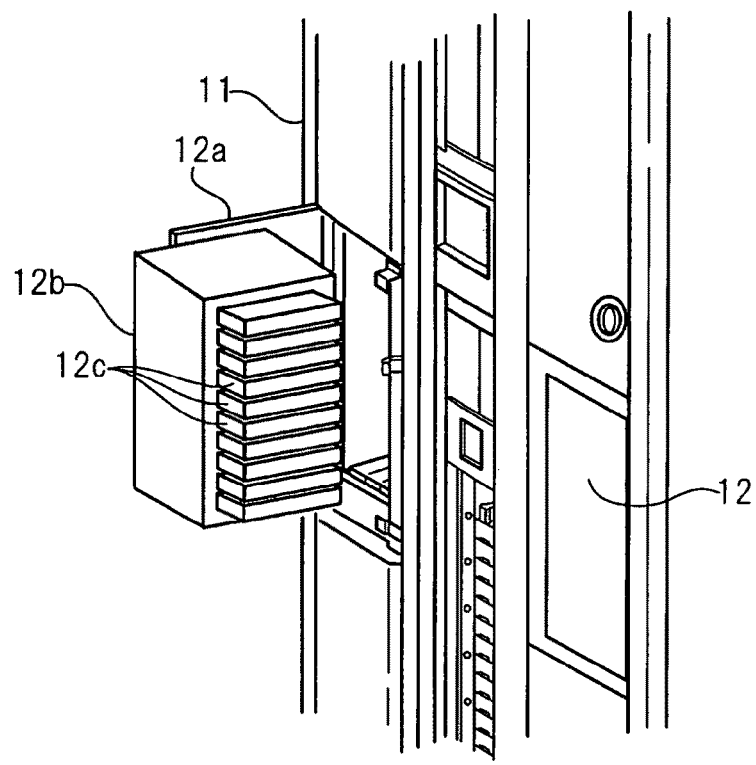

In FIGS. 1A and 1B are illustrated a housing 11 of the library apparatus 10 and two record medium in-and-out openings 12 for carrying in and out a magnetic tape in and from the library apparatus 10. In each of the record medium in-and-out openings 12 is provided with a door 12a opening outward. The door 12a is opened so that a magnetic tape stored in a magazine 12b may be carried in and from the library apparatus 10.

As illustrated in FIG. 1B, a cassette 12c in which magnetic tapes (not illustrated) up to ten maximum are stored may be put into this magazine 12b.

Incidentally, in the following explanation, a magnetic tape stored in the cassette is simply referred to as a magnetic tape.

FIG. 2 is a schematic diagram illustrating an internal structure of the library apparatus of the embodiment.

As illustrated in FIG. 2, this library apparatus 10 is provided with: a record medium in-and-out opening 12 to carry in and carry out a magnetic tape 13 in and from the library apparatus 10; a record medium storage shelf 14 which stores plural magnetic tapes; a magnetic tape drive 15 which is loaded with the magnetic tapes 13 to input and output information in the loaded magnetic tapes 13; a first robot 16 which is a robot in operation to transfer an information record medium between the record medium in-and-out opening 12 and the record medium storage shelf 14, and between the record medium storage shelf 14 and the magnetic tape drive 15; a second robot 50 which is a robot on standby to stand by at a predetermined position 59 as a reserve of the first robot 16; and a control device 20 to control an operation of the first robot and an operation of the second robot.

The record medium in-and-out opening 12 indicated by a dashed line in FIG. 2 corresponds to the magazine 12b illustrated in FIG. 1B. Although only four of the magnetic tapes are illustrated by the dashed line, actually, as illustrated in FIG. 1B, maximum ten of the magnetic tapes 13 may be stored.

Incidentally, the magnetic tapes 13 of the present embodiment correspond to an example of the information record medium according to the present invention. The magnetic tape drive 15 of the present embodiment corresponds to an example of the input-output device according to the present invention.

When the first robot 16 is controlled as a robot in operation by the control device 20, the first robot 16 performs operations such as: transferring the magnetic tapes between the record medium in-and-out opening 12 and the record medium storage shelf 14; transferring the magnetic tapes between the record medium storage shelf 14 and the magnetic tape drive 15; and a process of blowing air to an imaging device in cooperation with the second robot 50. Therefore, the first robot 16 includes a moving mechanism including rails 31, 32 to move the first robot 16 in directions of arrows A, B, C and D.

While the first robot 16 operates as a robot in operation, the second robot 50 stands by at a predetermined standby position as a robot on standby. And when a failure occurs in the first robot 16, the second robot 50 replaces the first robot 16 as a robot in operation based on a control form the control device 20.

In addition, the second robot 50 also is provided with a moving mechanism including rails 56, 57 to perform operations such as: transferring the magnetic tapes between the record medium in-and-out opening 12 and the record medium storage shelf 14; transferring the magnetic tapes between the record medium storage shelf 14 and the magnetic tape drive 15; and a process of blowing air to an imaging device in cooperation with the first robot 16.

The moving mechanism of the second robot 50 is configured as a separate mechanism independently from the moving mechanism of the first robot 16 described above, and the moving mechanisms are independently controlled by the control device 20.

Incidentally, although only one face of the record medium storage shelf 14 is illustrated in FIG. 2, two faces of the record medium storage shelves 14, 14' are arranged in parallel with the above-described two robots therebetween. Thus, the above-described two robots are configured such that they may access either one of the record medium storage shelves 14, 14' on both sides.

These record medium storage shelves 14, 14' with two faces are provided with respective plural cells 14a in which the magnetic tapes 13 are to be stored and which cells are attached with respective specific cell numbers.

The magnetic tapes 13 are attached with respective bar code labels (not illustrated) where bar codes are printed for identifying the respective magnetic tapes. The bar codes are read by a read unit 18 provided in the first robot 16 when a magnetic tape to be newly carried in is placed at the record medium in-and-out opening 12, and the bar code is used as information for storing the magnetic tape in a predetermined cell of the record medium storage shelves 14, 14' based on a control signal from the control device 20.

Figure 3A:
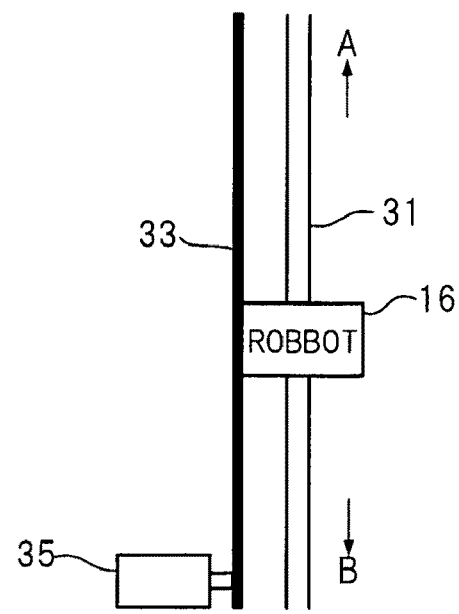
FIGS. 3A and 3B are a side view(3A) and a top view(3B) illustrating a driving mechanism of a robot of the embodiment.
Figure 3B:
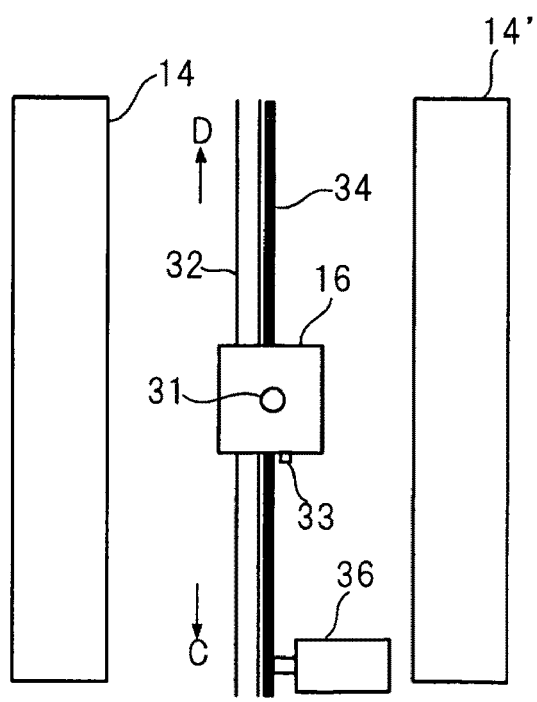

FIGS. 3A and 3B are a side view(3A) and a top view(3B) illustrating a driving mechanism of a robot of the embodiment.

Since the driving mechanism of the robot illustrated in FIG. 3 is common to the first robot 16 and the second robot 50, only the driving mechanism of the first robot 16 will be explained in the following explanation and an explanation about the driving mechanism of the second robot 50 is omitted.

As explained above, in the library apparatus of the present embodiment, the record medium storage shelves 14, 14' with two faces are arranged such that they sandwich the robot 16. The robot 16 may access the magnetic tapes stored in the cells of the record medium storage shelf a desired face of the two faces of the record medium storage shelves 14, 14' with the faces arranged in both sides of the robot.

As illustrated in FIG. 3A, the robot 16 is slidably supported by the rail 31 extending in a up-and-down direction(arrows A, B) and is capable of moving in the up-and-down direction by a timing belt 33 which circularly moves in the up-and-down direction and a servo motor 35 to drive the timing belt 33.

As illustrated in FIG. 3B, the rail 31 slidably supporting the robot 16 is slidably supported by a rail 32 extending in a depth direction(arrows C, D), and is capable of moving in the depth direction by a timing belt 34 which moves circularly in the depth direction and a servo motor 36 to drive the timing belt 34.

The robot 16 is moved to a position of a cell 14a (see FIG. 2) designated by the control device 20(see FIG. 2) by the driving mechanism such configured, and accesses a magnetic tape stored in the cell.

The second robot 50 also includes a driving mechanism similar to that of the first robot 16.

FIG. 4 is a diagram illustrating a magnetic tape stored in a record medium storage shelf of the embodiment.

In FIG. 4 is illustrated magnetic tapes 13 stored in the cell 14a of the second medium storage shelf. Each of the magnetic tapes 13 is provided with a bar code 21 to identify the magnetic tapes from each other.

The control device 20 (see FIG. 1) causes the read unit provided in the robot in operation to read the bar code 21 of the magnetic tape 13 positioned at the record medium in-and-out opening 12(see FIG. 1), and based on the read bar code, the control device 20 searches a cell number of a record medium storage shelf in which the magnetic tape 13 is to be stored and informs the robot in operation of the cell number. The robot in operation informed transfers the magnetic tape 13 to a cell 14a corresponding to the cell number to store the magnetic tape 13 in the cell 14a.

Figure 5:
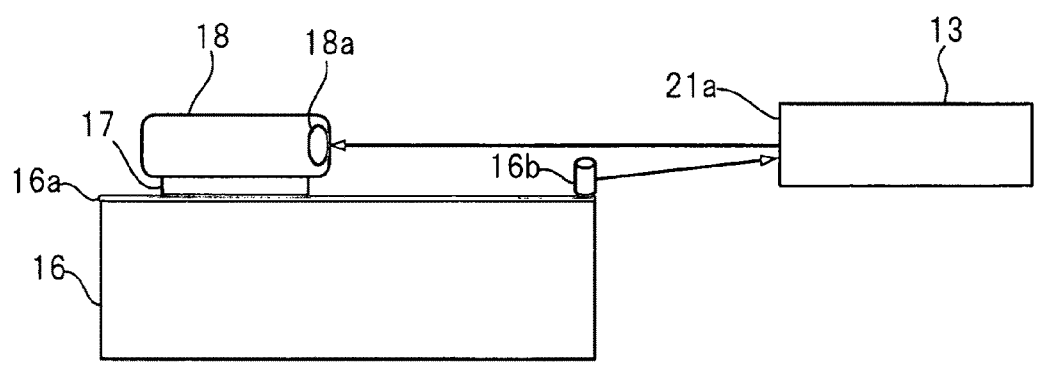
FIG. 5 is a diagram illustrating a relation between a robot in operation, a read unit and the magnetic tape of the embodiment.

FIG. 5 is a diagram illustrating a relation between a robot in operation, a read unit and the magnetic tape of the embodiment.

As illustrated in FIG. 5, a print circuit board 16a provided in an upper portion of the robot in operation 16 is attached with a magnet 17 to draw in the read unit 18 by the magnetic force. A CCD 18a is housed in the read unit 18.

The print circuit board 16a of the robot 16 is provided with an LED (Light Emitting Diode) 16b. The LED 16b irradiates light toward the bar code 21 of the magnetic tape 13. The CCD 18a reads the bar code 21 irradiated by the LED 16b.

Incidentally, the CCD 18a of the present embodiment corresponds to an example of the imaging device according to the present invention.

Incidentally, as described above, dust enters from the library apparatus and dust is produced inside the library apparatus. Both cause dust to float inside the library apparatus, and attach to a lens of the above-described CCD 18a, potentially leading to an error in reading the bar code. Accordingly, the library apparatus of the present embodiment is provided with a reference bar code label to detect whether a cause of the read error arises from an attachment of a dust to the CCD lens.

Figure 6:
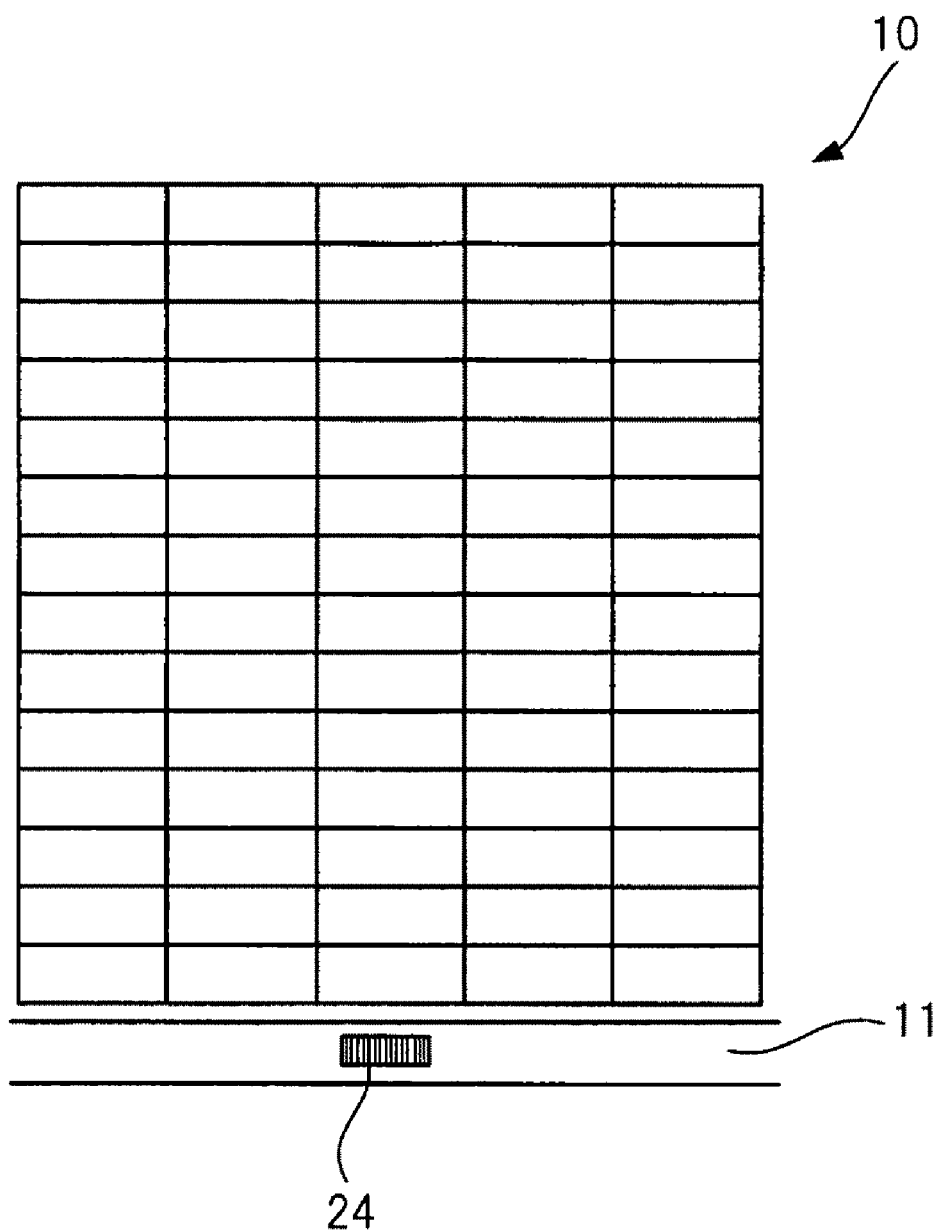
FIG. 6 is a diagram illustrating a reference bar code label provided in the library apparatus of the embodiment.

FIG. 6 is a diagram illustrating a reference bar code label provided in the library apparatus of the embodiment.

As illustrated in FIG. 6, a housing 11 in this library apparatus 10 is attached with a reference bar code label 24 for measuring a reference position of the robot in operation.

The reference bar code label 24 corresponds to an example of the reference mark according to the present invention. Incidentally, the reference mark of the present invention is not limited to a bar code label, and may be any mark as far as the mark may be used to detect a position where the read unit is attached to the robot in operation.

In the present embodiment, when an error occurs in reading the bar code by the robot in operation, the control device 20(see FIG. 2) causes the robot in operation to read the above-described reference bar code label 24. The control device 20 determines whether an error in reading the reference bar code label 24 occurs. If the error occurs in reading the reference bar code label 24, a cause of the error in reading is considered to be caused from the fact that a dust is attached to the lens of the CCD (imaging device) of the robot in operation. Therefore, as explained in the following, the control device 20 causes an air spray unit of the robot on standby to blow air to the CCD lens of the robot in operation.

Incidentally, if no error occurs in reading the reference bar code label 24, a cause of the error in reading is not considered to be a dust attachment to the CCD lens of the robot in operation. Therefore, the control device 20 does not blow air by the air spray unit of the robot in operation, and causes the robot in operation up to then to move to a predetermined standby position to stand by, and makes the robot on standby up to then to be a robot in operation. The robot which has become the robot on standby according to the current abnormality occurrence waits for a service by a service person.

As described above, in the present embodiment, the robot in operation and the robot on standby may relatively move to a predetermined positions and attitudes and may blow air to the respective counterpart's CCDs, and provided with the respective air blowing mechanisms by the respective air spray units.

Figure 7A:
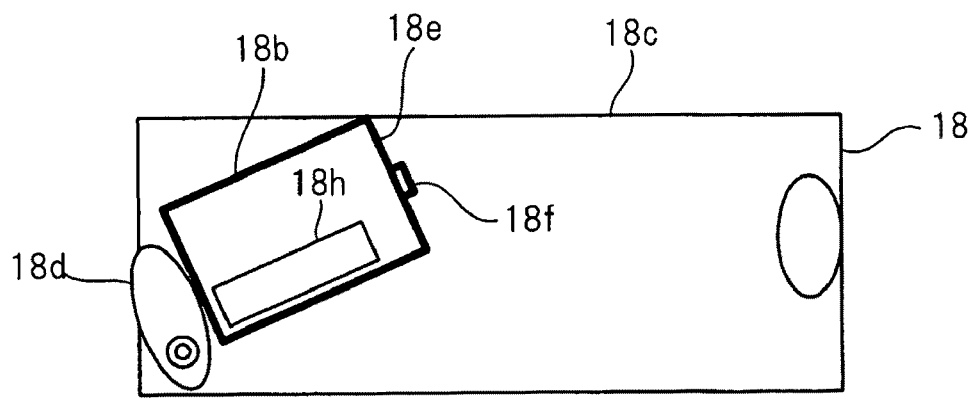
FIGS. 7A and 7B are diagrams illustrating an air blowing mechanism by a robot on standby in the library apparatus of the embodiment.
Figure 7B:
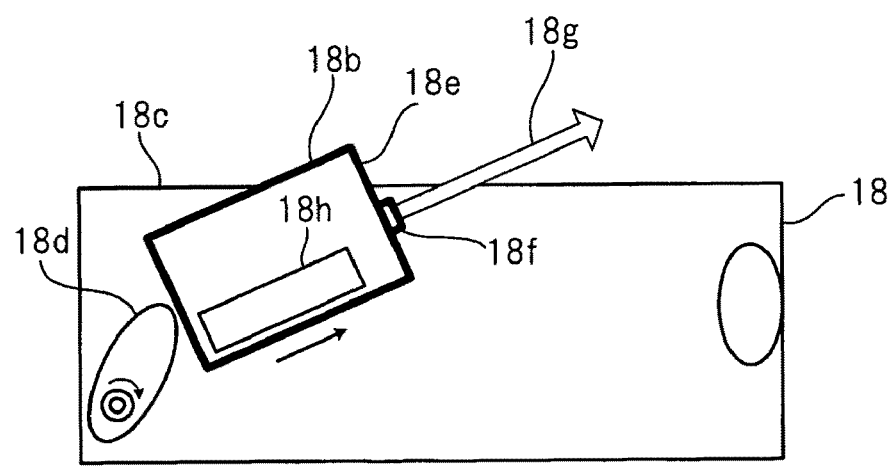

FIGS. 7A and 7B are diagrams illustrating an air blowing mechanism in a robot on standby in the library apparatus of the embodiment.

As illustrated in FIG. 7A, the read unit 18 of the robot on standby 50 is provided with an air spray unit 18b which is usually stored in a housing 18c of the read unit 18 and a cam mechanism 18d to project an end portion 18e of the air spray unit 18b outside the housing 18c and to draw the end portion 18e in the housing 18c.

A small air compressor 18h is housed in the air spray unit 18b. An air blowing nozzle 18f is provided in the end portion 18e. Thus, compressed air from the air compressor 18h is supplied via a pipe (not illustrated) to the air blowing nozzle 18f. Incidentally, replacing the air compressor 18h, for example, a changeable air cartridge may be used.

As illustrated in FIG. 7B, when air is blown, the cam mechanism 18d is rotated in an arrow direction so that the end portion 18e of the air spray unit 18b projects outside the housing 18c, and air 18g is blown out from the air blowing nozzle 18f provided in the end portion 18e to the CCD of the robot in operation.

Next, an air blowing operation to the imaging device of the robot in operation by the robot on standby in the present embodiment will be explained.

Figure 8:
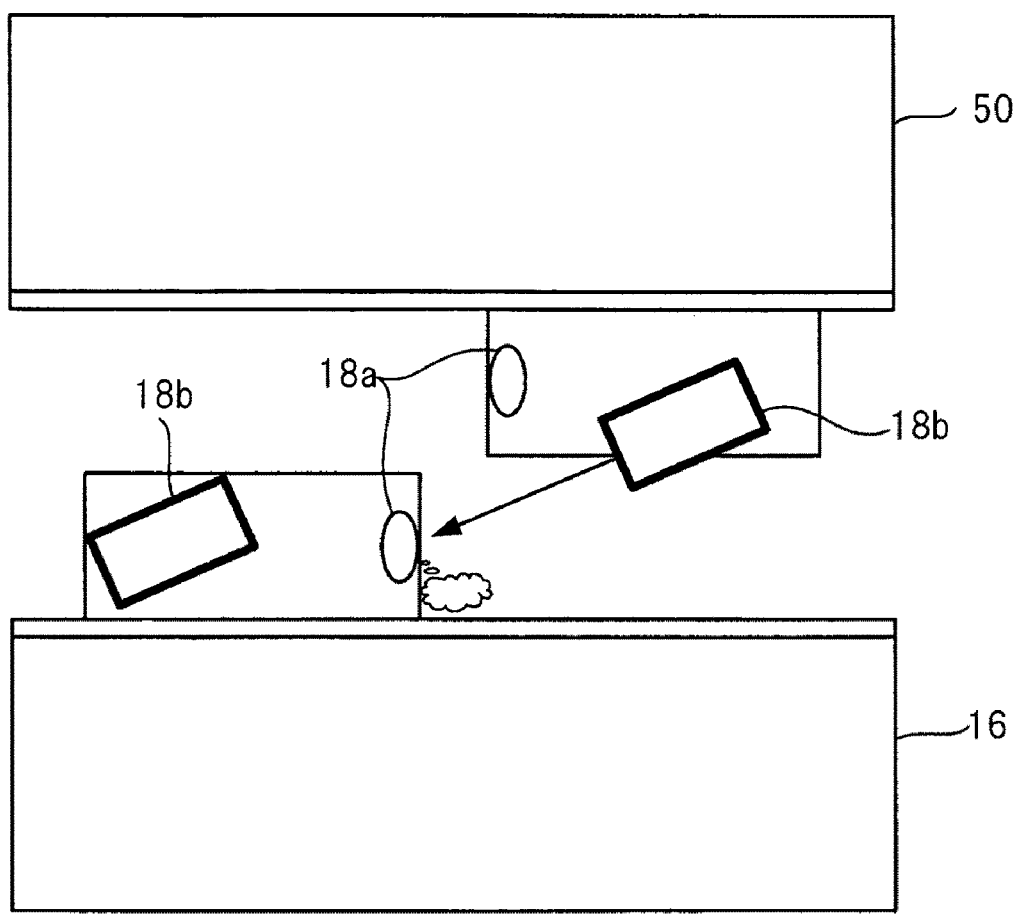
FIG. 8 is a diagram illustrating an air blowing operation in the library apparatus of the embodiment.

FIG. 8 is a diagram illustrating an air blowing operation in the library apparatus of the embodiment.

As illustrated in FIG. 8, the robot in operation 16 and the robot on standby 50 are provided with the respective air spray units 18b which are capable of relatively moving to predetermined positions and attitudes to blow air to the respective counterpart's CCDs 18.

As described above, when an error occurs in reading the bar code by the robot in operation 16, the control device 20 (see FIG. 2) causes the robot in operation 16 to read the reference mark 24 (see FIG. 6). If an error occurs in reading the reference mark 24, the control device 20 finds out a place where a time in which the robot in operation 16 and the robot on standby 50 relatively come close each other and become in attitudes to be able to blow air to the respective counterpart's CCDs becomes minimum, and causes the robot in operation 16 to move to a position corresponding to the place on the rails 31, 32 (see FIG. 2) of the robot in operation 16 and also after the control device 20 causes the robot on standby 50 to move to a position corresponding to the place on the rails 57, 58 (see FIG. 2) of the robot on standby 50, then causes the air spray unit 18b of the robot on standby 50 to blow air to the CCD 18a of the robot in operation 16.

Thus configured, if an error in reading occurs by a dust attachment to the robot in operation, since the robot in operation and the robot on standby in a short time reach each position where each may blow air to each other, and air is blown from the air spray unit of the robot on standby to clear the error in reading of the robot in operation so that it is possible to improve an availability factor of the library apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A library apparatus comprising:
   a housing;
   a record medium storage shelf that stores a plurality of information record media;
   an input-output device in which the information record medium is loaded and which inputs and outputs information in and from the loaded information record medium;
   a first robot that performs transfer between the record medium storage shelf and the input-output device;
   a second robot that stands by at a predetermined position as a reserve of the first robot; and
   a control device that controls operations of two of the first robot and the second robot, wherein
   the information record medium has a bar code for identification,
   the first robot and the second robot individually include a read unit which has an imaging device to optically read the bar code of the information record medium, and
   the second robot further includes an air spray unit, the second robot carries the air spray unit toward the first robot and the air spray unit blows air to the imaging device of the first robot.

2. The library apparatus according to claim 1, wherein the first robot further includes an air spray unit, the first robot carries the air spray unit toward the second robot and the air spray unit blows air to the imaging device of the second robot.

3. A library apparatus comprising:
   a housing;
   a record medium storage shelf that stores a plurality of information record media;
   an input-output device in which the information record medium is loaded and which inputs and outputs information in and from the loaded information record medium;
   a first robot that performs transfer between the record medium storage shelf and the input-output device;
   a second robot that stands by at a predetermined position as a reserve of the first robot; and
   a control device that controls operations of two of the first and second robot, wherein
   the information record medium has a bar code for identification, the first robot and the second robot individually include a read unit which has an imaging device to optically read the bar code of the information record medium, the second robot further includes an air spray unit which blows air to the imaging device of the first robot,
   the housing has a reference mark for measuring a reference position of the first robot, and
   the control device causes the first robot to read the reference mark when an error occurs in reading the bar codes by the first robot, and causes the air spray unit of the second robot to blow air to the imaging device of the first robot if an error occurs in reading the reference mark.

4. The library apparatus according to claim 2, wherein
   the housing has a reference mark for measuring a reference position of the first robot, and
   the control device causes the first robot to read the reference mark when an error occurs in reading the bar codes by the first robot, and causes the air spray unit of the second robot to blow air to the imaging device of the first robot if an error occurs in reading the reference mark.

5. A library apparatus comprising:
   a housing;
   a record medium storage shelf that stores a plurality of information record media;
   an input-output device in which the information record medium is loaded and which inputs and outputs information in and from the loaded information record medium;
   a first robot that performs transfer between the record medium storage shelf and the input-output device;
   a second robot that stands by at a predetermined position as a reserve of the first robot; and
   a control device that controls operations of two of the first and second robot, wherein
   the information record medium has a bar code for identification, the first robot and the second robot individually include a read unit which has an imaging device to optically read the bar code of the information record medium, and
   the second robot further includes an air spray unit which blows air to the imaging device of the first robot, and
   the control device causes the air spray unit to blow air to the imaging device while causing the first robot and the second robot to move relatively to each other.

6. The library apparatus according to claim 2, wherein the control device causes the air spray unit to blow air to the imaging device while causing the first robot and the second robot to move relatively to each other.

7. The library apparatus according to claim 3, wherein the control device causes the air spray unit to blow air to the imaging device while causing the first robot and the second robot to move relatively to each other.

8. The library apparatus according to claim 4, wherein the control device causes the air spray unit to blow air to the imaging device while causing the first robot and the second robot to move relatively to each other.

* * * * *